US009119225B2

(12) United States Patent
Muhamed et al.

(10) Patent No.: US 9,119,225 B2
(45) Date of Patent: *Aug. 25, 2015

(54) CENTRALIZED ACCESS CONTROL SYSTEM AND METHODS FOR DISTRIBUTED BROADBAND ACCESS POINTS

(71) Applicant: AT&T Intellectual Property I, L.P., Atlanta, GA (US)

(72) Inventors: Rias Muhamed, Austin, TX (US); Anil Kumar Doradla, Austin, TX (US); David Randall Wolter, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,657

(22) Filed: Oct. 16, 2012

(65) Prior Publication Data
US 2013/0094402 A1 Apr. 18, 2013

Related U.S. Application Data

(63) Continuation of application No. 11/064,418, filed on Feb. 23, 2005, now Pat. No. 8,316,434.

(51) Int. Cl.
H04W 4/00 (2009.01)
H04W 88/08 (2009.01)
H04W 76/02 (2009.01)
H04W 28/16 (2009.01)
H04W 12/02 (2009.01)
H04L 29/06 (2006.01)
H04W 84/10 (2009.01)

(52) U.S. Cl.
CPC .............. *H04W 88/08* (2013.01); *H04W 12/02* (2013.01); *H04W 28/16* (2013.01); *H04W 76/022* (2013.01); *H04L 63/0272* (2013.01); *H04W 76/02* (2013.01); *H04W 84/105* (2013.01)

(58) Field of Classification Search
CPC .......................... H04W 76/022; H04L 12/2446
USPC .................................................. 370/338, 419
See application file for complete search history.

(56) References Cited

U.S. PATENT DOCUMENTS 6,263,369 B1   7/2001   Sitaraman et al.
6,301,665 B1  10/2001   Simonich et al.
(Continued)

OTHER PUBLICATIONS

Non-Final Office Action for U.S. Appl. No. 11/064,418, mailed Sep. 15, 2008, 12 pages.
(Continued)

Primary Examiner — Ricky Ngo
Assistant Examiner — Dewanda Samuel
(74) Attorney, Agent, or Firm — Toler Law Group, PC

(57) ABSTRACT

A method includes automatically sending a request from a wireless access point to a configuration server during a power-up procedure for the wireless access point. The method includes receiving virtual private network tunnel parameters at the wireless access point from the configuration server in response to the request. The virtual private network tunnel parameters identify an access gateway. The method also includes establishing a virtual private network tunnel between the wireless access point and the centralized access gateway during the power-up procedure based on the virtual private network tunnel parameters. The virtual private network tunnel enables the wireless access point to provide one or more wireless devices access to a wide area network.

20 Claims, 2 Drawing Sheets

(56) References Cited

U.S. PATENT DOCUMENTS

| | | | |
|---|---|---|---|
| 6,453,461 B1 | 9/2002 | Chaiken | |
| 6,636,894 B1 | 10/2003 | Short et al. | |
| 6,795,700 B2 | 9/2004 | Karaoguz et al. | |
| 6,862,444 B2 | 3/2005 | Karaoguz et al. | |
| 6,885,859 B2 | 4/2005 | Karaoguz et al. | |
| 7,009,319 B2* | 3/2006 | Hartsfield, Jr. | 310/156.38 |
| 7,046,989 B2 | 5/2006 | Karaoguz et al. | |
| 7,099,957 B2 | 8/2006 | Cheline et al. | |
| 7,117,526 B1* | 10/2006 | Short | 726/5 |
| 7,120,420 B2 | 10/2006 | Karaoguz et al. | |
| 7,171,460 B2 | 1/2007 | Kalavade et al. | |
| 7,260,379 B2 | 8/2007 | Karaoguz et al. | |
| 7,277,547 B1* | 10/2007 | Delker et al. | 380/270 |
| 7,298,702 B1 | 11/2007 | Jones et al. | |
| 7,318,101 B2* | 1/2008 | Droms | 709/229 |
| 7,324,469 B2 | 1/2008 | Wilson | |
| 7,382,771 B2 | 6/2008 | Leblanc et al. | |
| 7,386,296 B2 | 6/2008 | Karaoguz et al. | |
| 7,389,534 B1* | 6/2008 | He | 726/15 |
| 7,433,650 B2 | 10/2008 | Karaoguz et al. | |
| 7,466,986 B2 | 12/2008 | Halcrow et al. | |
| 7,526,272 B2 | 4/2009 | Karaoguz et al. | |
| 7,532,898 B2 | 5/2009 | Halcrow et al. | |
| 7,551,577 B2 | 6/2009 | McRae | |
| 7,552,870 B2 | 6/2009 | Jones | |
| 7,561,890 B2 | 7/2009 | Jendbro et al. | |
| 7,568,220 B2 | 7/2009 | Burshan | |
| 7,577,121 B2 | 8/2009 | Han et al. | |
| 7,633,909 B1* | 12/2009 | Jones et al. | 370/338 |
| 7,711,097 B2 | 5/2010 | Ji et al. | |
| 7,725,128 B2 | 5/2010 | Marsh et al. | |
| 7,730,219 B2 | 6/2010 | Chambers, Jr. et al. | |
| 7,738,488 B2 | 6/2010 | Marsico et al. | |
| 7,814,483 B2 | 10/2010 | Li et al. | |
| 7,821,984 B2 | 10/2010 | Wilson | |
| 7,873,538 B2 | 1/2011 | Karaoguz et al. | |
| 7,894,837 B2 | 2/2011 | Heredia et al. | |
| 7,903,567 B2 | 3/2011 | Hancock et al. | |
| 7,912,641 B2 | 3/2011 | Osentoski et al. | |
| 7,929,486 B2* | 4/2011 | Karaoguz et al. | 370/328 |
| 8,019,342 B2 | 9/2011 | Karaoguz et al. | |
| 8,023,966 B2 | 9/2011 | Aaltonen | |
| 8,036,191 B2 | 10/2011 | Kroselberg et al. | |
| 8,086,218 B2 | 12/2011 | Karaoguz et al. | |
| 8,086,245 B2 | 12/2011 | Karaoguz et al. | |
| 8,130,635 B2 | 3/2012 | Suvi et al. | |
| 8,131,847 B2 | 3/2012 | Kalbag | |
| 8,140,364 B2 | 3/2012 | Kannan et al. | |
| 8,191,124 B2 | 5/2012 | Wynn et al. | |
| 8,194,589 B2 | 6/2012 | Wynn et al. | |
| 8,196,188 B2 | 6/2012 | Wynn et al. | |
| 2002/0129271 A1* | 9/2002 | Stanaway et al. | 713/201 |
| 2002/0144144 A1* | 10/2002 | Weiss et al. | 713/201 |
| 2003/0051041 A1 | 3/2003 | Kalavade et al. | |
| 2004/0047320 A1 | 3/2004 | Elgin et al. | |
| 2004/0052223 A1 | 3/2004 | Karaoguz et al. | |
| 2004/0148430 A1 | 7/2004 | Narayanan | |
| 2004/0174900 A1 | 9/2004 | Volpi et al. | |
| 2004/0203593 A1* | 10/2004 | Whelan et al. | 455/411 |
| 2004/0203752 A1 | 10/2004 | Wojaczynski et al. | |
| 2004/0255167 A1 | 12/2004 | Knight | |
| 2006/0089121 A1 | 4/2006 | Elgebaly et al. | |
| 2006/0191005 A1 | 8/2006 | Muhamed et al. | |

OTHER PUBLICATIONS

Final Office Action for U.S. Appl. No. 11/064,418, mailed Mar. 23, 2009, 11 pages.

Non-Final Office Action for U.S. Appl. No. 11/064,418, mailed Jul. 27, 2009, 10 pages.

Non-Final Office Action for U.S. Appl. No. 11/064,418, mailed Jan. 14, 2010, 16 pages.

Final Office Action for U.S. Appl. No. 11/064,418, mailed May 25, 2010, 16 pages.

Non-Final Office Action for U.S. Appl. No. 11/064,418, mailed Sep. 23, 2010, 18 pages.

Final Office Action for U.S. Appl. No. 11/064,418, mailed Mar. 14, 2011, 17 pages.

Non-Final Office Action for U.S. Appl. No. 11/064,418, mailed Aug. 2, 2011, 19 pages.

Final Office Action for U.S. Appl. No. 11/064,418, mailed Feb. 13, 2012, 20 pages.

Notice of Allowance for U.S. Appl. No. 11/064,418, mailed Jul. 19, 2012, 29 pages.

* cited by examiner

CENTRALIZED ACCESS CONTROL SYSTEM AND METHODS FOR DISTRIBUTED BROADBAND ACCESS POINTS

PRIORITY CLAIM

This application is a continuation of, and claims priority to, U.S. patent application Ser. No. 11/064,418, filed on Feb. 23, 2005, and entitled "CENTRALIZED ACCESS CONTROL SYSTEM AND METHODS FOR DISTRIBUTED BROADBAND ACCESS POINTS, which is hereby incorporated by reference in its entirety.

FIELD OF THE DISCLOSURE

The present disclosure relates generally to accessing network assets and more particularly to centralized access control systems and methods for distributed broadband access points.

BACKGROUND

The number of public locations such as airports and coffee shops that provide Internet access continues to grow. These public access locations are commonly referred to as "venues," "hotspots," and/or broadly as "access points." Wireless hotspots can be a place where patrons, while visiting an establishment, are permitted to interface with and utilize a computer connected to the Internet via wireless technology, and may consist of multiple wireless elements known as access points.

Deployed hotspots often include a special switch that validates a requesting user's right to utilize the hotspot and to access the Internet via its associated network. In some cases, the switch may be relatively feature-rich and support several functions. In other cases, the switch may simply block a user's traffic until the user's right to use the hotspot and network is validated. However implemented, including a switch at a hotspot location increases costs. Switches generally can be referred to as access control gateways (ACG). Providers have attempted to reduce these switch-related costs by providing an ACG that has a reduced purchase It would be desirable to keep the implementation and maintenance cost of hotspots minimized without limiting the features and functionality of the hotspot. Accordingly, what is needed is a cost effective solution that facilitates rapid and broad deployment of broadband wireless public access, but does not compromise functionality, manageability, scalability, and security of the network.

BRIEF DESCRIPTION OF THE DRAWINGS

It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION

A hotspot consisting of a wireless access point module having plug and play functionality may provide substantial benefits to business owners, Internet service providers, and subscribers. In accordance with teachings disclosed herein, a wireless access point module may be deployed with a memory and a processor configured such that during "power-up" the processor reads instruction from memory and automatically creates a virtual private network (VPN) tunnel or connection to a centralized access gateway. In practice, the wireless access point module may subsequently utilize the VPN connection for at least some subscriber and/or subscriber-related communications. When subscribers connect to the wireless access point, a remote authorization authentication and accounting (AAA) module associated with a centralized gateway may be utilized to authorize the subscribers. Traffic associated with this authentication process may travel via the VPN connection. Moreover, subscribers may be allowed to utilize the established VPN to subsequently access the Internet. For example, an authorized subscriber may be granted unlimited Internet access via the virtual private network connection.

A centralized access control gateway incorporating teachings disclosed herein may be configured to receive authorization requests originating from a user's local area wireless device through a VPN tunnel established between a wireless access point tunneling client and a tunneling server.

As indicated above, a wireless access point module (WAPM) may be placed at a public place such as a café and may allow subscribers to enjoy a mobile office where they can exchange information with sources around the world. To reduce the cost and complexity of deploying a given WAPM, the access point module described herein may utilize a centralized access control gateway (ACG) for providing services like authorization. In practice, an ACG may help create and/or support a restricted or "private" communication link and seamlessly connect to a plurality of distributed WAPMs. When a WAPM requires updates or changes, the maintenance may also be accomplished with the help of an ACG at a central location reducing the need to individually visit and upgrade each venue. Network management as a result may become less costly, potentially more profitable, and manageable.

A central ACG-remote WAPM architecture may also help expand network deployment to underserved areas. For example, such an architecture may improve the attractiveness of deploying access points at small venues such as restaurants and coffee shops where the coverage footprint and traffic density is relatively low (i.e. there is a small number of users).

Figure 1:
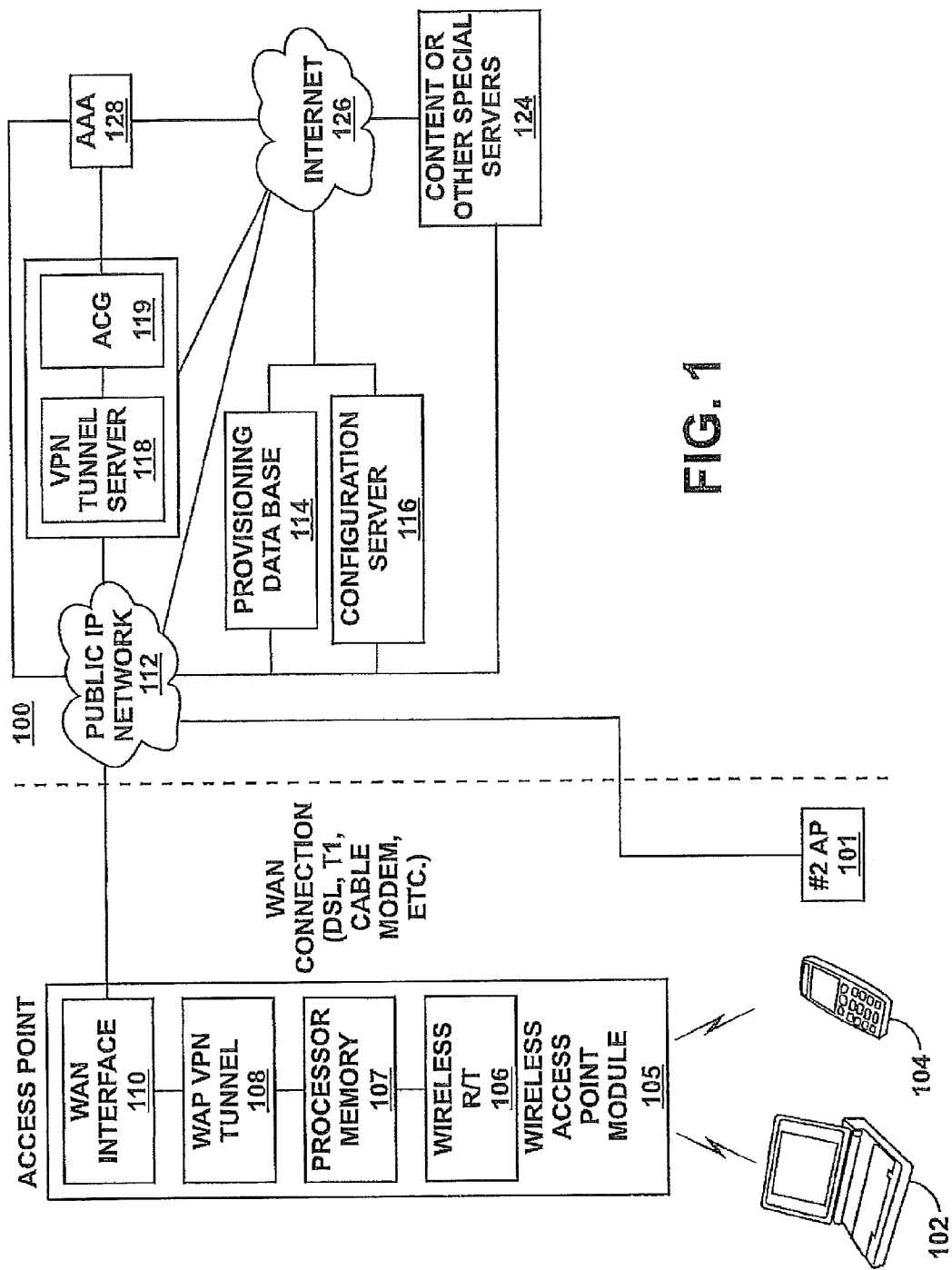
FIG. 1 presents a simplified configuration of a centralized access control for a plurality of distributed access points that incorporates teachings of the present disclosure.

The illustrative system of FIG. 1 provides a low cost, plug and play remote wireless access point module for facilitating subscriber communications with a communications network such as the Internet 126. System 100 includes a first subscriber 102 and a second subscriber 104 having access to Internet 126 via a wireless access point module (WAPM) 105. The system can include a plurality of access points as is illustrated by WAPM 105 and second access point module 101. An access point can provide features similar to that of a "wireless hub" and the access point can be configured to support a local area network (LAN). As depicted, WAPM 105 can include a memory/processor combination 107. The memory may store instructions, and the processor may execute those instructions.

WAPM may also include a wireless receiver-transmitter 106, a virtual private network (VPN) tunnel engine 108, and a wide area network (WAN) interface 110. In hard-wired configurations, wireless receiver-transmitter 106 could be replaced with a standard hardwired Ethernet card. And, depending on design concerns, WAN interface 110 could include a modem, a router, and/or a switch such as an Ethernet switch or any device that can interface and/or transmit data from premises having an access point to a public communications network and/or a managed IP network like network 112.

As shown, WAPM 105 may be connected to an IP network 112 utilizing many different connection modalities such as a digital subscriber line (DSL), a T1 line, an antenna, a coaxial cable, a fiber optic cable, etc. IP network 112 may be configured to transmit and receive data utilizing an Internet protocol or any other protocol that supports networked devices. Although network 112 is illustrated separately from Public Internet 126, the line delineating the two networks may be blurred in various implementations. Internet 126 and/or network 112 "the network" may be communicatively coupled to provisioning database 114, configuration server 116, and network VPN tunnel server 118, and access control gateway (ACG) 119. An authentication authorization and accounting (AAA) module 128 may also be coupled to ACG 119 for authorizing users of the network. Content or other special services server 124 may also be communicatively coupled to the WAPM 105. The content or special services server 124 may, for example, supply restricted access for information or services over the Internet 126. For example, a special services server 124 may provide access to a website for downloading music or videos requiring a subscriber to pay a subscriber fee.

The access point can utilize many different formats to communicate with subscribers 102 and 104. One such form includes a wireless communication standard such as WiFi, and WiMax; however any wireless technology such as infrared or spread spectrum technology and secure protocols could be utilized with the illustrated configuration. Alternately, a hardwired plug and play access point could be utilized without parting from the spirit and scope of the present teaching.

In practice, first subscriber 102 could utilize a laptop computer having a wireless card, and second subscriber 104 could utilize a handheld computer such as a personal digital assistant, or a mobile telephone to communicate with the wireless receiver-transmitter 106. Two wireless subscribers and two types of subscriber devices are illustrated, however hundreds of thousands of wireless subscribers utilizing hundreds of different types of subscriber devices could be supported by the described system. In one configuration multiple access points at a given venue, particularly a big venue such as a football stadium or an airport can be connected to each other utilizing a larger LAN or an Ethernet system having hubs and routers. The Ethernet hub can then provide broadband interconnectivity to the Internet 126.

Depending upon implementation detail, a system incorporating teachings of the present disclosure may be described in four parts, (1) a network architecture that provides a centralized access control gateway for a plurality of access points; (2) an integrated WAPM capable of linking to an ACG; (3) an auto-configured VPN tunnel engine for helping to authenticate subscribers from a broadband access point; and (4) subscriber management.

Centralized Access Control Gateway

A network architecture associated with a centralized gateway approach is illustrated in FIG. 1. Distributed access points can be located hundreds of miles away from a designated ACG. Depending upon design considerations, the WAN node connecting the centralized ACG like ACG 119 may be placed at an ISP Point of Presence, a Data Center, a central office, a remote teiminal or a broadband remote access server location or proximate to a main communication trunk. The centrally located ACG may provide for efficient maintenance, troubleshooting, diagnosis, and upgrading when operational inefficiencies cause problems for the subscribers, the access point owner, the communication provider, and/or the ISP.

Additionally, complex functions and services can be efficiently added at the central location to provide a highly scaleable implementation. For example, an ACG like ACG 119 may be more prone to fail, become outdated, or reach maximum user capacity. The costs related to determining the problem and solving the problem possibly by adding equipment is greatly reduced with the centralized system described herein. Moreover, a given network provider like an ISP, often has skilled technicians onsite at central locations where the centralized ACG can be easily monitored and protected. For example, when new software versions are available for viruses and the like, changes can be implemented at the central ACG 119 without having to send a technician to dozens of venues miles away to maintain each access point.

It may also be advantageous to centrally locate a VPN tunnel server 118 and AAA module 128. This allows for more efficient communication between ACG 119, VPN servers 112 and AAA module 128. Further, tunnel server 118, ACG 119 and AAA module 128 can be maintained, serviced, and/or upgraded much more easily because of their convenient location. The number of access points that can be serviced by and communicate with a single ACG 119 can be determined by the capabilities and performance requirements of the access points 101, 105, the capacity of the ACG 119, and parameters of a transport network, which may include elements of network 112 and/or 126. As compared to a simple WiFi hub, an ACG may be relatively expensive to purchase, install, and maintain. By implementing a centralized ACG 119, it may be possible to amortize the cost of the network access functionality across several access points. A centralized ACG may be able to service hundreds of access points and thus, the processing resources of a single ACG 119 may be shared by several access points. In FIG. 1, only two access points 105 and 101 are illustrated for simplicity, however it may be possible to serve hundreds of access points with a single ACG 119.

An Integrated WAPM Linking to an ACG

The disclosed centralized configuration provides greater efficiency and economy particularly if the WAPM has integrated elements and utilizes a plug and play or auto-provisioning configuration to form a link with an AGC. In several implementations, a subscriber may not be allowed to completely utilize the capabilities provided by an access point until the WAPM can establish and/or confirm the subscriber's right to use the WAPM. Initial communications between a user device and a WAPM may involve standards-based communications associated with link establishment, ID assignment, etc. After some initial configurations, a virtual private network (VPN) link may be utilized to perform functions like those associated with an AAA server. To facilitate this aspect of the teachings, a WAPM may include an auto-VPN establishment feature, which will be described in more detail in the section below.

WAPM 105 may be relatively simple and include a processor 107 with memory, a wireless receiver transmitter 106, a modem or router creating a broadband WAN interface 110 (e.g. a conduit to interface a communication line such as a DSL line or a coaxial cable, or a T1 line interface) and a VPN tunneling mechanism 108. All of these elements may be housed, for example, in a single enclosure. However, this is not required as the elements may be separate without affecting the system operation. In one configuration, the components can be integrated on a single circuit board. Essentially, WAPM 105 may convert a standard broadband access connection (e.g. a phone line) at a given venue into a secure multi-user, wireless broadband public Internet access point. This access point may also be capable of establishing a "tunneled" connection with a central ACG.

An auto-configuration/handshake process conducted by WAPM 105 can facilitate "self-installing" a network security system at the public access point. A secure WAN connection from an access point via an auto-configuration WAPM 105 may be accomplished utilizing different methods. For example, WAPM 105 may at power-up broadcast a request over network 112 and/or Public Internet 126, and configuration server 116 can act as a "link detector." Thus, configuration server 116 may determine that a WAPM is connected and ready to communicate. Configuration server 116 could store the identity of WAPM 105, determine an appropriate response, and respond to the initial WAPM 105 transmission. Configuration server 116 may then initiate a software download to the WAPM as part of a handshake/auto-configuration process. The software provided to WAPM 105 may be tailored to WAPM 105 and allow WAPM to establish a VPN tunnel to server 118.

In another implementation, WAPM 105 may send a message to a known configuration server 116 based on pre-programmed instructions. The message may represent a request from WAPM 105 to be "turned on" or to be brought into a VPN relationship with a centralized ACG. The message may be sent automatically at power-up and may include identifying information such as a media access control (MAC) number, an Internet Protocol (IP) address and/or any identifier for WAPM 105. In practice, the turn-on message may be sent from WAPM 105 to a predetermined configuration server loaded in WAPM's memory 107 prior to shipment of the WAPM 105 to a customer. With this approach, configuration server 116 may be directly prompted by the requesting WAPM over the Internet or the public IP network 112.

In yet another implementation, provisioning database 114 can store a look up table that maps each WAPM to a given ACG. WAPM 105 and/or configuration server 116 could, for example, access provisioning database 114 to determine a pre-assigned WAPM-ACG configuration. Similarly, a specialized "start-up" ACG may be provided and configured to initiate set-ups or provision for WAPMs that are new to a network. Thereafter, a WAPM-ACG assignment may be modified to create an optimum or desired configuration. To improve system performance, proximity, traffic density and capacity may be utilized to determine an appropriate WAPM-ACG interconnect configuration.

As indicated above, an initial WAPM 105 communication can be sent at power up. Whenever sent, a communication from WAPM 105 may be sent utilizing a simple network management protocol (SNMP) or other IP based message along with the unique identifier of the WAPM 105. In a large-scale deployment, there may be several WAPMs and several ACGs distributed throughout a service provider's network. To help identify and track the appropriate ACG for a given venue or WAPM, a database, possibly contained in the centralized provisioning database 114 can map each WAPM 105 to a particular ACG. An access point and an ACG may be identified and linked in the database by an identifier such as a media access control (MAC) address, a serial number, an Internet protocol (IP) address, a domain name, a programmed number, a physical address, a geographical location, or a phone line identifier (Caller ID). Some other electronic identifier may be utilized without parting from the scope and spirit of the teachings herein.

In yet another implementation, a WAPM may request configuration instructions during a dynamic host configuration information protocol (DHCP) negotiation process (e.g. option 66 and 67 of the DHCP protocol). During such an auto-configuration process, configuration server 116 may custom configure each WAPM by downloading software contained, for example, in provisioning database 114.

If a venue has DSL authentication provisions, WAPM 105 may store and utilize a predefined start-up configuration that utilizes known DSL WAN transport provisions. Software instructions may be loaded in to memory of the ACG or the WAPM 105 such that the processor in the WAPM 105 can auto-configure and begin a communications session (get authorized and join the communication network as an active device). This plug and play feature may also provide the ability of WAPM 105 to automatically configure its operational parameters such as the IP address, protocols, communication speed etc. and automatically transmit and receive data. In practice, the WAPM may be designed to reconfigure its operational parameters at any time based on instruction received from a centralized configuration server. WAPM 105 may also be designed so that every time it is connected or "plugged in" to a broadband connection it transmits a request and its network presence is detected and it receives configuration instruction.

Other network devices such as AAA module 128, configuration server 116, and provisioning database 114 may be included in this network device assignment handshake. In one illustrative embodiment, provisioning database 114 can collect and store network assignments and parameters such as network device identifiers (i.e. IP addresses), device-to-device assignments, and VPN configurations. Additionally, centrally located provisioning database 114 could also store network auto-configuration data such as, how to configure an individual WAPM, what capabilities a given WAPM has, what version of software a given WAPM has, the number of subscribers supported by the WAPM, the closest and most efficient network connection for the WAPM, the ACG assigned to the WAPM 105, subscriber plans, other information, and/or some combination thereof.

Auto Configured VPN Tunnel

After initial "handshaking" and WAPM-ACG matching, a virtual private network (VPN) may be established between a WAPM and an ACG. Generally, a VPN is a communication channel created between two devices over a public network, wherein the communication channel is "point to point" and confines data transmissions within the established channel. A VPN establishes a "tunnel" such that the data transmissions are bundled or encapsulated in another format to keep the data within the established channel. Thus, address and routing requests that are encapsulated will not control the networking process. A VPN offering can help assure that subscribers accessing a WAPM will communicate through the selected ACG.

Depending upon implementation detail, when a newly installed WAPM seeks auto-setup for broadband access, configuration server 116 may require the WAPM to create a VPN with the ACG. The instruction needed by a WAPM, for example WAPM 105, to establish a VPN may be pre-stored and/or downloaded to the WAPM during the WAPM-ACG handshake process via provisioning database 119. Likewise, the target ACG may receive tunneling instruction from provisioning database 119.

In one configuration, the VPN tunnel may be created by WAPM VPN tunnel engine 108 initiating a session with the network VPN tunnel server 118. The VPN systems can use encryption and other security mechanisms to ensure that an unauthorized user can only access a specific location such as the ACG 116 or the AAA module 128. Tunneling parameters may be stored in, and retrieved from the provisioning database 114. In one implementation, configuration server 116 may act as a mediator and transmit the VPN parameters to the WAPM and the ACG. Depending upon designer concerns, a single tunnel may be established and may be utilized by all subscribers connected to a given WAPM like WAPM 105. However, each subscriber device may establish its own VPN with an ACG.

In an illustrative embodiment, after a VPN tunnel is established, the subscriber may be required to communicate through the ACG. For example, WAPM 105 and/or ACG 119 may block all unauthorized users from gaining connectivity to the general Internet or other private servers connected behind it by requiring all WAPM 105 connected devices to communicate over the VPN. A hardware mechanism or process may be built into WAPM 105 that ensures that WAPM traffic (subscriber traffic) is carried to central ACG 119. Similarly, VPN tunneling instructions may be stored in the WAPM memory prior to shipment to the venue to facilitate similar traffic routing patterns.

Tunneling may be achieved in any number of ways. For example, a VPN client may support a protocol like IPSec, IP in IP, GRE, and/or L2TP. On the network side, VPN tunnel server 118 capabilities could be built-into the same box as ACG 119. The capabilities could also be implemented on a separate platform connected to central ACG 119 such as at VPN tunnel server 118.

Subscriber Management

Subscribers can purchase many different Internet access plans or subscriptions. The subscriptions can be purchased from the owners of the access points, communications providers, an ISP, and/or some other entity. In one configuration, an ISP can determine what plans will be available at each access point. To help facilitate this type of offering, WAPM 105, ACG 119, AAA module 128 and/or provisioning database 114 may store subscription plan (e.g. rate for services, speed of the connection, access, etc.) that is specific to an access point or specific to a subscriber. Once a particular venue/access point is provisioned each customer, or group of customers, may be given special treatment by network components like WAPM 105 based on the subscription plan that they have purchased.

Subscription plans may be simple or complex depending on the type of services provided. In simple cases, every user may have and pay for a standard monthly Internet service. In more complex service plans, such as time-based plans or per user sessions plans, subscriber access must be authorized, monitored, and billed. In performance-based plans, increased speeds, bandwidth, and complex privacy features may be available and controlled by ACG 119. ACG 119 may also facilitate subscriber plans by accessing data in central (AAA) system 128. In accordance with the teachings herein, communication system 110 can restrict WAPM 105 and subscriber communications to a single centralized ACG 119. A VPN can be the conduit to restrict WASP 105 based communications to a single authorization device. As part of the auto-provisioning a virtual privacy network (VPN) method or configuration can be utilized to funnel subscriber traffic to a predetermined location until a subscriber is identified and authorized by AAA module 128.

Figure 2:
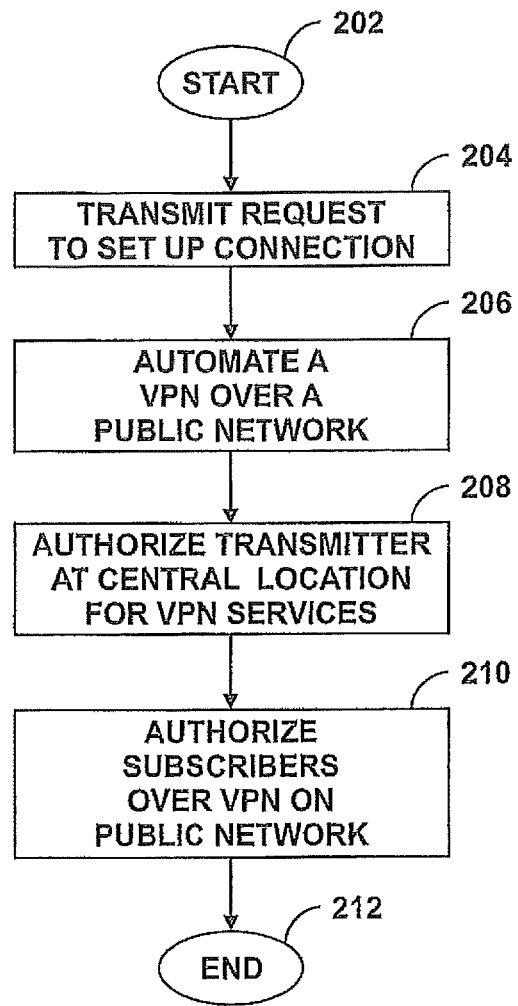
FIG. 2 illustrates a flow diagram of a method of providing centralized access for a plurality of plug and play access points that incorporates teachings of the present disclosure.

Referring to FIG. 2, a flowchart illustrating a method for providing and securing an auto configuration process is disclosed. The method starts at step 202 and proceeds to step 204 where an access point module that is connected to a network transmits a request for connection. The transmission could be a request for the creation of a WAPM-ACG association. In one case, the request for connection may include an access point identifier to indicate a network device presence. After a given network device establishes a relationship/connection, a VPN connection can be configured over a network at step 206. Utilizing the VPN, the transmitter of the connection request may be authorized at a central location as illustrated in step 208. When subscribers connect to an established WAPM, one that has created a tunnel, the tunnel may be utilized to authorize the subscribers as illustrated by step 210. Once the subscriber is authorized, the subscriber may be granted the ability to communicate with other devices on the network, however structured, the process may end at step 212.

The above-disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An access point comprising:
   a processor;
   a wide area network interface coupled to the processor; and
   a memory coupled to the processor, wherein the memory comprises instructions executable by the processor, upon power-up of the access point, to enable the access point to:
      automatically send a request to a configuration server, wherein the request includes an identification of the access point, and wherein the request is sent directly to the configuration server based on data in the memory;
      receive virtual private network tunnel parameters from the configuration server;
      establish, via the wide area network interface, a virtual private network tunnel between the access point and a centralized access control gateway based on the virtual private network tunnel parameters received from the configuration server, wherein the virtual private network tunnel provides access to destinations outside of a local area wireless network associated with the access point for a wireless device coupled to the access point; and
      receive update software via the centralized access control gateway.

2. The access point of claim 1, further comprising a wireless receiver-transmitter to couple the wireless device to the access point.

3. The access point of claim 1, further comprising a virtual private network tunneling mechanism to establish the virtual private network tunnel.

4. The access point of claim 1, further comprising a wired network interface to enable a device to communicate via the virtual private network by a wired connection between the device and the wired network interface.

5. The access point of claim 1, wherein the update software includes a security update, a software version update, or both.

6. The access point of claim 1, wherein authorization of the wireless device to utilize the access point is provided by an authentication, authorization, and accounting module coupled to the centralized access control gateway.

7. The access point of claim 1, wherein the access point is configured to receive upgraded instructions via the centralized access control gateway.

8. The access point of claim 1, wherein the access point is configured to change operational parameters based on instructions received from the centralized access control gateway.

9. The access point of claim 1, wherein the access point receives software from the configuration server, and wherein the software is executable by the processor to establish the virtual private network tunnel to the centralized access control gateway.

10. A method comprising:
automatically sending a request from a wireless access point to a configuration server that selects an access gateway for the access point based on a network speed, a network service load, or both during a power-up procedure for the wireless access point, wherein the request is sent directly to the configuration server based on data stored in a memory of the wireless access point;
receiving virtual private network tunnel parameters at the wireless access point from the configuration server in response to the request, wherein the virtual private network tunnel parameters identify the access gateway; and
establishing a virtual private network tunnel between the wireless access point and the access gateway with the wireless access point during the power-up procedure based on the virtual private network tunnel parameters, wherein the virtual private network tunnel enables the wireless access point to provide a wireless device access to a wide area network.

11. The method of claim 10, further comprising enabling a device to communicate via the virtual private network by a wired connection between the device and the wireless access point.

12. The method of claim 10, wherein the request includes an identifier of the wireless access point.

13. The method of claim 10, wherein the data identifies the configuration server.

14. The method of claim 10, wherein the request is sent to the configuration server based on a media access control address of the wireless access point, a serial number of the wireless access point, an internet protocol address of the wireless access point, or a location of the wireless access point.

15. The method of claim 10, further comprising:
receiving a security update at the wireless access point via the private network tunnel; and
implementing the security update at the wireless access point.

16. A computer-readable storage device storing instructions that, when executed by a processor, cause the processor to perform operations comprising:
automatically sending a request to a configuration server that is configured to determine an access gateway via access to a provisioning database during a power-up procedure for a wireless access point that includes the processor;
establishing a virtual private network tunnel between the wireless access point and the access gateway with the wireless access point based on virtual private network tunnel parameters received from the configuration server in response to the request, wherein the virtual private network tunnel parameters identify the access gateway, and wherein the virtual private network tunnel enables the wireless access point to provide a wireless device access to a wide area network; and
receiving update software at the wireless access point via the access gateway.

17. The computer-readable storage device of claim 16, wherein the update software includes a security update, a software version update, or both.

18. The computer-readable storage device of claim 16, wherein the request is sent to a particular configuration server based on data retrieved from the computer-readable storage device.

19. The computer-readable storage device of claim 16, wherein the access gateway is configured to block access to the wide area network for unauthorized wireless devices.

20. The computer-readable storage device of claim 16, wherein the request includes an identification of the wireless access point.

* * * * *